(12) United States Patent
Lang et al.

(10) Patent No.: US 11,524,607 B2
(45) Date of Patent: Dec. 13, 2022

(54) DYNAMIC ERGONOMIC SURFACE

(71) Applicant: Bayerische Motoren Werke Aktiengesellschaft, Munich (DE)

(72) Inventors: Franziska Lang, Ventura, CA (US); Martin Francisco, Pasadena, CA (US); Eric Brown, North Hollywood, CA (US); Matthew Potter, Porter Ranch, CA (US); Paul Ferraiolo, Ventura, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 770 days.

(21) Appl. No.: 16/548,734

(22) Filed: Aug. 22, 2019

(65) Prior Publication Data

US 2021/0053465 A1 Feb. 25, 2021

(51) Int. Cl.
*B60N 2/02* (2006.01)
*B60R 7/04* (2006.01)
*B60N 2/75* (2018.01)
*B60R 13/02* (2006.01)

(52) U.S. Cl.
CPC .......... *B60N 2/0252* (2013.01); *B60N 2/763* (2018.02); *B60R 7/04* (2013.01); *B60R 13/02* (2013.01); *B60R 2013/0287* (2013.01)

(58) Field of Classification Search
CPC .... B60N 2/0244; B60N 2/0248; B60N 2/763; B60N 2/75; B60R 13/02; B60R 7/04
See application file for complete search history.

(56) References Cited

U.S. PATENT DOCUMENTS

| | | | |
|---|---|---|---|
| 2010/0289302 A1* | 11/2010 | Cheng | B60N 2/0244 700/282 |
| 2015/0231991 A1* | 8/2015 | Yetukuri | B60N 2/002 297/284.11 |

FOREIGN PATENT DOCUMENTS

EP 1462030 A1 * 9/2004 ............... A47C 4/54

* cited by examiner

*Primary Examiner* — Lori L Lyjak
(74) *Attorney, Agent, or Firm* — Crowell & Moring LLP

(57) ABSTRACT

A dynamic ergonomic surface system for use in a motor vehicle includes an ergonomic surface that is inlayed in a surrounding surface and transitions between states, including: a neutral state in which the ergonomic surface is consistent with the surrounding surface, and at least one ergonomic support state in which the ergonomic surface provides ergonomic support for a user operating an input device. The dynamic ergonomic surface system also includes a sensor system that detects events triggering the transition between states, and a controller that controls the ergonomic surface to transition between the states in response to the detected events.

19 Claims, 3 Drawing Sheets

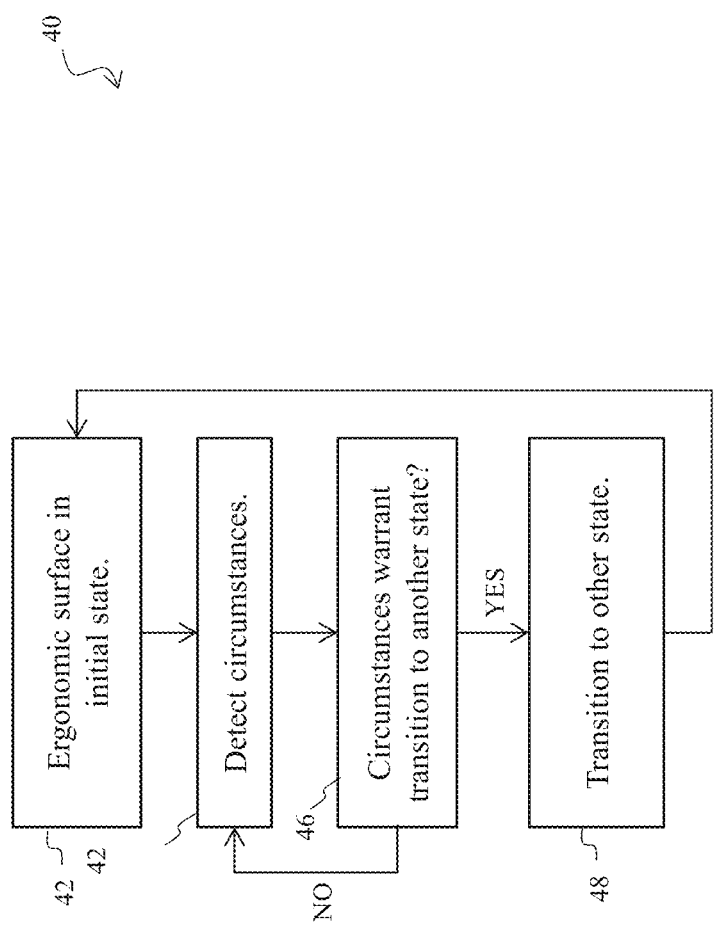

DYNAMIC ERGONOMIC SURFACE

FIELD OF THE INVENTION

The present invention relates generally to ergonomic surfaces, and in particular, to such ergonomic surfaces that dynamically adapt their shape to detected circumstances.

BACKGROUND OF THE INVENTION

Modern motor vehicles may include control systems that attempt to unify multiple functions under the control architecture of a dashboard mounted display and an input device (e.g., control knob, touchpad, etc.) mounted in the center console. Despite the advantages of such unified control systems, their layouts typically encourage a static pivot point—from the elbow to the wrist—for engaging the input device.

Modern motor vehicles also typically include adjustable seats and armrests. But these systems are large-scale mechanical, and are not therefore able to adapt dynamically or automatically to the changing positions of users utilizing the unified control systems discussed above. As such, the driving experience of the user is reduced.

Accordingly, there is a need for systems and methods for providing dynamic ergonomic surfaces, particularly in connection with unified control systems, which do not suffer from the above-noted drawbacks.

SUMMARY OF THE INVENTION

Disclosed and claimed herein are systems and methods for providing dynamic ergonomic surfaces.

The system includes a dynamic ergonomic surface system for use in a motor vehicle includes an ergonomic surface that is inlayed in a surrounding surface and transitions between states, including: a neutral state in which the ergonomic surface is consistent with the surrounding surface, and at least one ergonomic support state in which the ergonomic surface provides ergonomic support for a user operating an input device. The dynamic ergonomic surface system also includes a sensor system that detects an event triggering the transition between states, and a controller that controls the ergonomic surface to transition between the states in response to the detected event. Accordingly, dynamic ergonomic surfaces, particularly in connection with unified control systems, which do not suffer from the above-noted drawbacks, may be provided.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein:

FIG. 4 is a flowchart of the exemplary operational process of the dynamic ergonomic surface system;

DETAILED DESCRIPTION OF THE PREFERRED EMBODIMENTS

Figure 2:
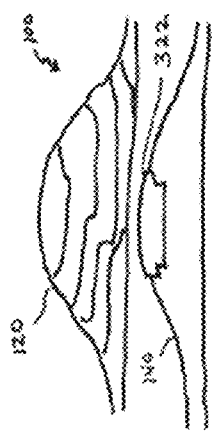
FIG. 2 is an exploded side view of the exemplary dynamic ergonomic surface system.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

Figure 3:
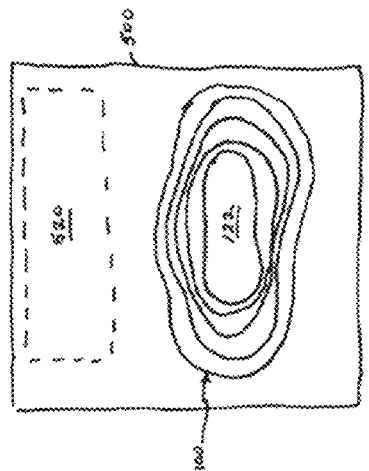
FIG. 3 is a top view of the dynamic ergonomic surface system.
Figure 1:
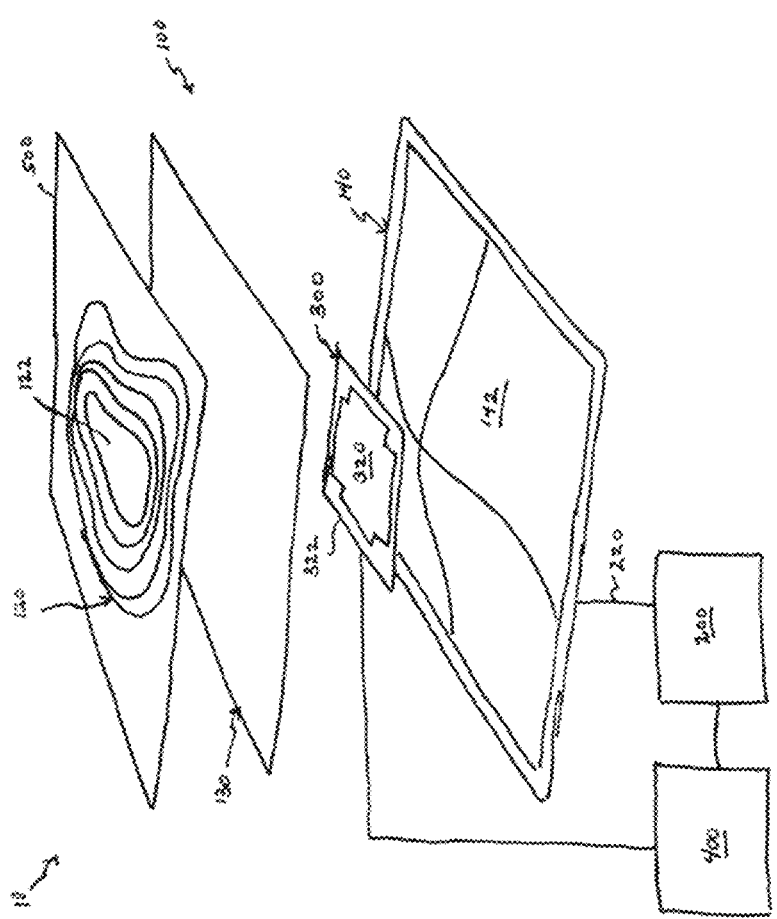
FIG. 1 is an exploded perspective view of an exemplary dynamic ergonomic surface system according to at least one embodiment.

FIGS. 1-3 illustrate a dynamic ergonomic surface system 10 for use in, for example, a motor vehicle. The system comprises: a dynamic ergonomic surface 100 operatively coupled one or more pumps 200, a sensor system 300 and a controller 400 configured to control the dynamic ergonomic surface, via operation of the one or more pumps, in response to data provided by the sensor system.

The ergonomic surface is configured to transition between a neutral state, and one or more support states. The neutral state may be such that the contours of the ergonomic surface are substantially consistent with the contours of a surrounding surface 500. Indeed, the neutral state may be such that the ergonomic surface is virtually indistinguishable to the user from the surrounding surface. To that end, the patterned layer may be constructed of rigid or semi-rigid material, such as wood, plastic, metal or other such materials as the surrounding surface. To that same end, the patterned layer may also be preferably substantially flush at its edge(s) with the surrounding surface. By contrast, the one or more support states may be such that the contours of the ergonomic surface are configured to comfortably and/or ergonomically support a body part of the user thereon. An exemplary support state is shown, for example, in FIG. 2.

The ergonomic surface may comprise: an ergonomic layer 120 and a bladder layer 140 positioned substantially adjacent to and below the ergonomic layer. The ergonomic layer may include a plurality of closed shaped surface sections 122 whose respective positions and orientations are adjustable via the operation of the bladder layer. In particular, the bladder layer may be inflated and deflated so as to cause the repositioning and reorienting of the surface sections, which thereby transitions the ergonomic surface between the neutral state and the one or more support states.

Each surface section may be defined by at least one edge abutting at least one adjacent surface section, and defining a shape of the surface section. The surface sections may be regular or irregularly shaped, so as to affect the ergonomics of the ergonomic surface. In addition, the surface sections may be arranged so as to closely fit together without significant gaps or overlap. Exemplary surface sections are shown, for example, in FIG. 3.

Adjacent surface sections may be elastically coupled to each other, such that the desired shape of the ergonomic surface is achieved via the selective inflation and deflation of the bladder layer. The elastic coupling of the surface sections may also reduce occurrences of patterned sections becoming dislodged or otherwise displaced in contrast to the desired shape of the ergonomic surface. In at least one embodiment, the elastic coupling is via an elastic layer 130 arranged adjacent to and below the ergonomic layer. The surface sections may be affixed, either adhesively or otherwise, to the elastic layer.

The bladder layer is configured to be selectively inflated so as to thereby exert pressure on one or more of the surface sections, pushing the surface sections outward relative to the surrounding surface in accordance with the one or more support states. Accordingly, the bladder layer may comprise an elastic or otherwise deformable bladder that includes one or more chambers 142 therein arranged such that the selective inflation of the one or more chambers selectively deforms the bladder in accordance with the desired shape or contour of the patterned layer.

The one or more chambers may be inflated with air (or other fluid) via the one or more pumps, which are each operatively coupled to the controller and also to the chamber(s) via one or more lines 220. The pump is configured to, under control by the controller, selectively pump air into and out of each of the chambers of the bladder layer. Accordingly, each of the one or more lines is operable, in connection with the pump, to transfer the pumped air into and/or out of the chamber from the surrounding environment. Alternatively, the pump may be configured to use fluid from a reservoir (not shown) to inflate and deflate the chambers.

The one or more chambers may be arranged according to one or more patterns. For example, the one or more chambers may be arranged according to a matrix pattern, a concentric ringed pattern, and/or some other pattern. In at least one embodiment, the one or more chambers are arranged to be substantially coextensive with the surface sections of the ergonomic layer, such that inflated chambers each primarily exert pressure against corresponding pattern sections in a one-to-one fashion. However, in at least one embodiment, the one or more chambers are not arranged to be coextensive with the surface sections, but are arranged such that inflated specific chambers each exert pressure against multiple surface sections.

The sensor system includes one or more sensors 320 operatively coupled to the controller and configured to detect user interaction with the system. In particular, the sensor system is configured to detect one or more events that affect the adjustment of the ergonomic surface between and among the neutral and one or more support states. The one or more events may include, for example, the user in the process performing an activity that would benefit from the ergonomic surface being in a given state. The one or more events may be determined via the detection of circumstances, which may include, but are not limited to, the location of the body part of the user, the behavior of the user, the positions of other objects with respect to the ergonomic surface, and driving conditions. Accordingly, the sensors may include one or more pressure sensors, proximity sensors, motion sensors, cameras, accelerometers, gyroscopes, magnetometers, etc., each operatively coupled to the controller. The sensors also need not be exclusive to the system, but may be shared with other vehicle systems such that the sensor system is part of an expanded sensor system that generally detects circumstances related to the motor vehicle and its occupants.

In at least one embodiment, the sensor system includes a pressure pad 322 positioned between the bladder layer and the ergonomic layer. The pressure pad is configured to detect the location and magnitude of pressure applied to the ergonomic layer, and to transmit corresponding data to the controller. The controller, in turn, determines, from the sensor data, the event(s) affecting the adjustment of the ergonomic surface. The controller then controls the pump to selectively inflate and/or deflate one or more chambers of the air bladder layer in order to adjust the shape of the ergonomic layer to the desired shape corresponding to the detected event(s). Other sensor data may be utilized to detect the event(s), including other pressure sensors, proximity sensors, motion sensors, cameras, accelerometers, gyroscopes, magnetometers, etc.

The sensors may be further configured to, individually and/or collectively, detect the event(s) under which further adjustments to the shape of the ergonomic surface may be warranted. Sets of detected event(s) may be correlated to particular states of the ergonomic surface, which correlations may be stored in the memory, via a reference table, or in a remote database to which the controller has access via a network link (not shown). The sensor data, including historical sensor data, may also be stored in the memory. The particular states of the ergonomic surface may be defined by, for example, shape, density, height, width, depth, etc., which characteristics may also be stored in the memory and correlated with such states.

The controller is communicatively coupled to the sensor system and the pump, and is configured to control each in accordance with their operations. Accordingly, the controller is configured to access the sensor data and reference tables, and to determine therefrom whether and which of the neutral and support states is warranted in response to the detected event(s). The controller may then control the operation of the pump to achieve the warranted state.

The controller may include appropriately configured hardware, such as, for example, one or more processors, memories, data busses and input/output interfaces, as well as appropriate software for instructing the controller to operate the other components in accordance with the principles described herein. The processor may be a standard processor, such as a central processing unit (CPU), or may be a dedicated processor, such as an application-specific integrated circuit (ASIC) or a field programmable gate array (FPGA). The memory may be hardware capable of storing information accessible by the processor, such as a ROM, RAM, hard-drive, CD-ROM, DVD, write-capable, read-only, etc. The memory may further store a set of instructions included in software that can be implemented by the processor to perform the various controls, either individually or in connection with other components, in accordance with the principles discussed herein. Moreover, although the controller is described herein as a separate structure, it will be understood that the controller may be partially or wholly realized as additional functionality of one or more existing vehicle system processors.

FIG. 4 illustrates an exemplary process by which the system operates.

In Step 42, the ergonomic system is in an initial or current state, which may be the neutral state or a support state.

In Step 44, the sensor system attempts to detect event(s) suggesting that one of the supporting states is warranted, and the sensor data is transmitted to the controller for analysis. For example, the sensor system may detect the user reaching for or using an input device 520 in the surrounding surface, e.g., a console armrest, adjacent the ergonomic surface, or that the user is not reaching for or using the input device.

Figure 5B:
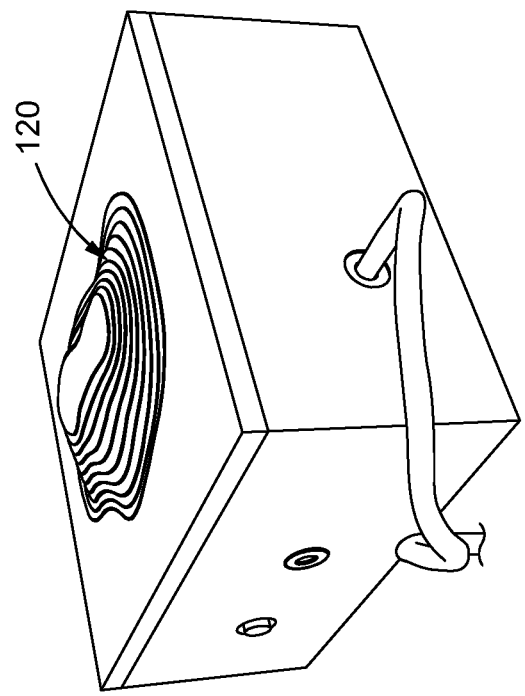
FIGS. 5A and 5B illustrate a transition between states of the exemplary dynamic ergonomic surface in accordance with at least one embodiment.
Figure 5A:
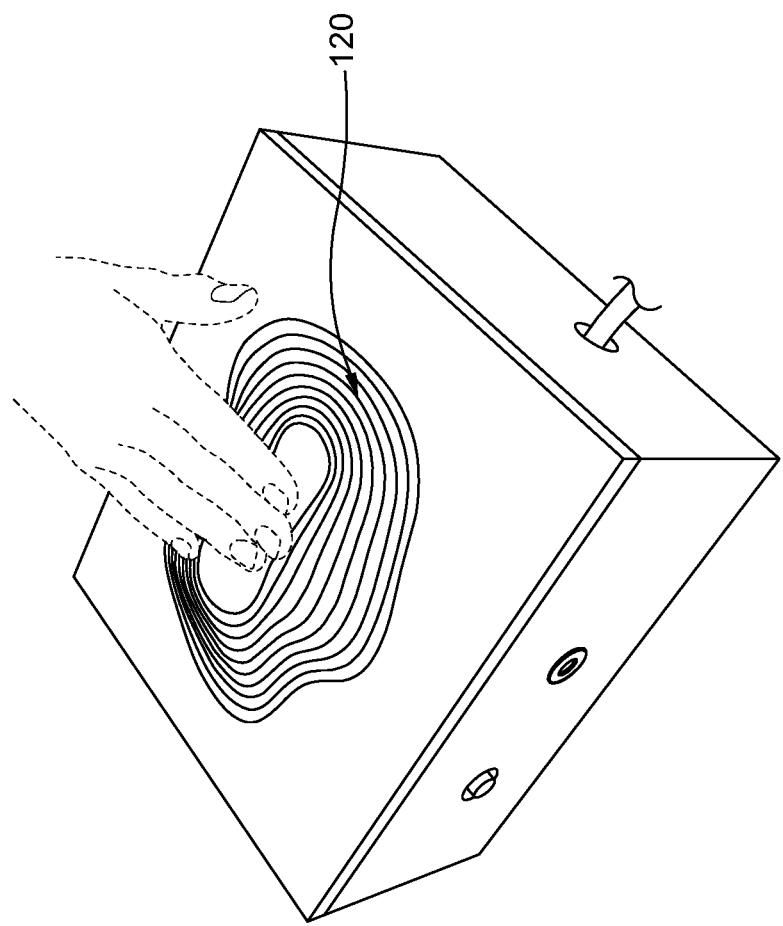

In Step 46, based on the sensor data and the reference table, the controller determines whether a change in the state is warranted, and to what state. For example, where the sensor data indicates that the user is reaching for or using the control device, the controller determines that a change to a first support state from among a plurality of support states is warranted. FIG. 5A shows, for example, the user reaching across the ergonomic surface.

In Step 48, the controller then controls the pump so that the first support state is achieved by the ergonomic surface. If the ergonomic surface was in the neutral state, it transitions to the first support state. FIG. 5B shows, for example, the support state triggered by the detection of the user in FIG. 5A, omitting the user for ease of viewing. If the ergonomic surface was in another support state, it transitions to the first support state. If the controller determines that no change is warranted, the support state remains unaltered.

The process then enters a detection and response loop, returning to Step 42, according to which loop the sensor system and the controller can continue to operate to determine whether a further change to the state is warranted, and, if so, to change the state accordingly. It will be understood that this state change also includes changing from the support states to the neutral state.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein in terms of functionality generally include hardware and/or software/firmware, including but not limited to: processors, memories, input/output interfaces, operating systems and network interfaces, configured to effectuate the functionalities described herein, as would be understood by one of ordinary skill in the art. When implemented in software, the elements of the invention are essentially the code segments to perform the necessary tasks. The code segments can be stored in a non-transitory processor readable medium, which may include any non-transitory medium that can store information. Examples of the non-transitory processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation. It will also be understood that the examples and embodiments described herein are not intended to be limiting, but are rather intended to be illustrative of the principles of operation of certain aspects of the disclosed invention.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A motor vehicle, comprising:
    an ergonomic surface inlayed in a surrounding surface, the ergonomic surface configured to transition between states, the states including: a neutral state in which the ergonomic surface is consistent with the surrounding surface, and at least one ergonomic support state in which the ergonomic surface provides ergonomic support for a user operating an input device;
    a sensor system configured to detect an event triggering the transition between states;
    a controller configured to control the ergonomic surface to transition between the states in response to the detected event.

2. The motor vehicle of claim 1, wherein the surrounding surface is a seat armrest.

3. The motor vehicle of claim 1, wherein the surrounding surface is a center console.

4. The motor vehicle of claim 1, wherein while in the neutral state, the ergonomic surface is virtually indistinguishable from the surrounding surface.

5. The motor vehicle of claim 1, wherein the transition is between ergonomic support states.

6. The motor vehicle of claim 1, wherein the ergonomic surface comprises:
    an ergonomic layer having a plurality of closed shaped surface sections whose relative positions are adjustable, and
    a bladder layer, positioned below the ergonomic layer and configured to be inflated and deflated so as to adjust the relative positions of the surface sections so as to thereby transition the ergonomic surface between states.

7. The motor vehicle of claim 6, wherein the surface sections fit closely together without significant gaps or overlap.

8. The motor vehicle of claim 7, wherein the surface sections are elastically coupled to each other.

9. The motor vehicle of claim 8, wherein the elastic coupling is via an intermediate layer of elastic material positioned between the ergonomic layer and the bladder layer.

10. The motor vehicle of claim 6, wherein the bladder layer includes a plurality of inflatable and deflatable chambers, whose inflation and deflation adjusts the relative positions of the surface sections so as to thereby transition the ergonomic surface between states.

11. The motor vehicle of claim 1, wherein the sensor system includes at least one pressure pad positioned between the ergonomic layer and the bladder layer.

12. A method for providing ergonomic support to a user, the method comprising:
providing, within the motor vehicle, an ergonomic surface inlayed in a surrounding surface, the ergonomic surface configured to transition between states, the states including: a neutral state in which the ergonomic surface is consistent with the surrounding surface, and at least one ergonomic support state in which the ergonomic surface provides ergonomic support for the user operating an input device;
detecting, via a sensor system, an event triggering the transition between states;
controlling, via a controller, the ergonomic surface to transition between the states in response to the detected event.

13. The motor vehicle of claim 12, wherein while in the neutral state, the ergonomic surface is virtually indistinguishable from the surrounding surface.

14. The motor vehicle of claim 12, wherein the transition is between ergonomic support states.

15. The motor vehicle of claim 12, wherein the method further comprises:
controlling a bladder layer, positioned below the ergonomic layer, to inflate so as to adjust the relative positions of a plurality of closed shaped surface sections of the ergonomic layer, so as to thereby transition the ergonomic surface between states.

16. The motor vehicle of claim 15, wherein the method further comprises:
inflating one or more chambers of the bladder layer to adjust the relative positions of the surface sections so as to thereby transition the ergonomic surface between states.

17. The motor vehicle of claim 12, wherein the method further comprises:
controlling a bladder layer, positioned below the ergonomic layer, to deflate so as to adjust the relative positions of a plurality of closed shaped surface sections of the ergonomic layer, so as to thereby transition the ergonomic surface between states.

18. The motor vehicle of claim 17, wherein the method further comprises:
deflating one or more chambers of the bladder layer to adjust the relative positions of the surface sections so as to thereby transition the ergonomic surface between states.

19. The motor vehicle of claim 12, wherein the sensor system includes at least one pressure pad positioned between the ergonomic layer and the bladder layer.

* * * * *